March 23, 1954

J. T. OSTERMAN 2,672,760

WINDSHIELD WIPER

Filed April 25, 1951

INVENTOR.
JOSEPH T. OSTERMAN
BY
Raymond A. Vaquer
ATTORNEY.

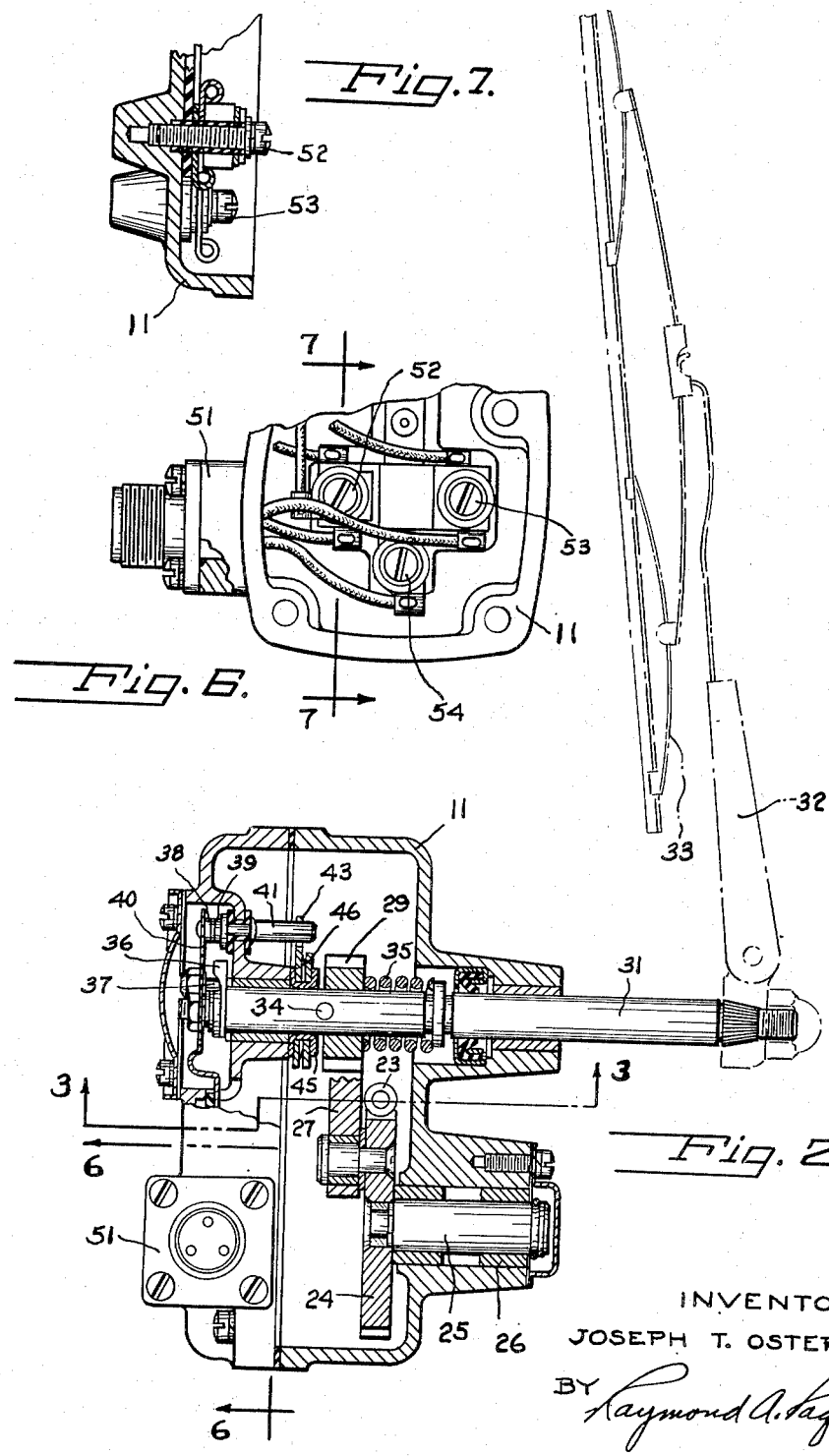

March 23, 1954

J. T. OSTERMAN 2,672,760

WINDSHIELD WIPER

Filed April 25, 1951

INVENTOR.
JOSEPH T. OSTERMAN

BY Raymond A. Paquin
ATTORNEY.

Patented Mar. 23, 1954

2,672,760

UNITED STATES PATENT OFFICE 2,672,760

WINDSHIELD WIPER

Joseph T. Osterman, Wilbraham, Mass., assignor to American Bosch Corporation, Springfield, Mass., a corporation of New York Application April 25, 1951, Serial No. 222,899

5 Claims. (Cl. 74—78)

This invention relates to windshield wiping apparatus and has particular reference to a new and improved apparatus particularly intended for use on such vehicles as buses and trucks where heavy duty apparatus is necessary.

An object of the invention is to provide a new and improved heavy duty, high torque, windshield wiping apparatus.

Another object is to provide such an apparatus of the oscillating shaft type which permits the mounting of the wiper blade actuating arm directly on the drive shaft without the necessity of intermediate linkages.

Another object is to provide a windshield wiping mechanism which is waterproof and radio quiet or shielded.

Another object is to provide an apparatus of the type set forth with a new and improved drive or transmission mechanism.

Other objects and advantages of the invention will be apparent from the following description taken in connection with the accompanying drawings in which the preferred form of the invention has been shown by way of illustration only.

Referring to the drawings:

Fig. 2 is a sectional view taken on line 2—2 of Fig. 1, looking in the direction of the arrows;

Fig. 5 is a sectional view taken on line 5—5 of Fig. 3, looking in the direction of the arrows;

Fig. 6 is a fragmentary sectional view taken on line 6—6 of Fig. 2, looking in the direction of the arrows; and Fig. 7 is a sectional view taken on line 7—7 of Fig. 6, looking in the direction of the arrows.

Figure 1:
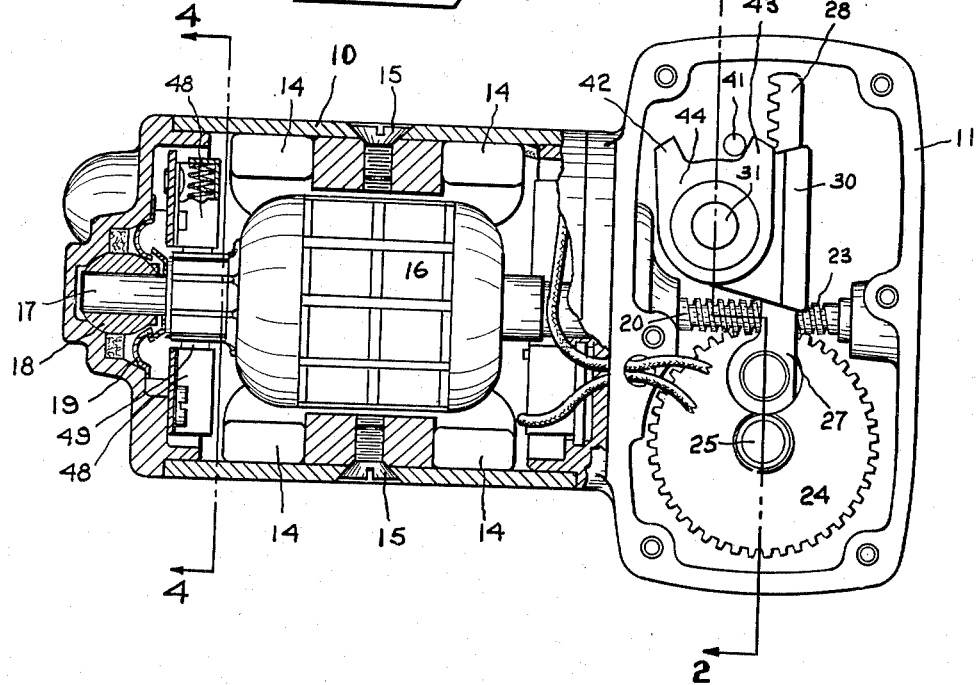
Fig. 1 is a longitudinal view, partly in section, of the motor and transmission of the windshield wiping apparatus.
Figure 3:
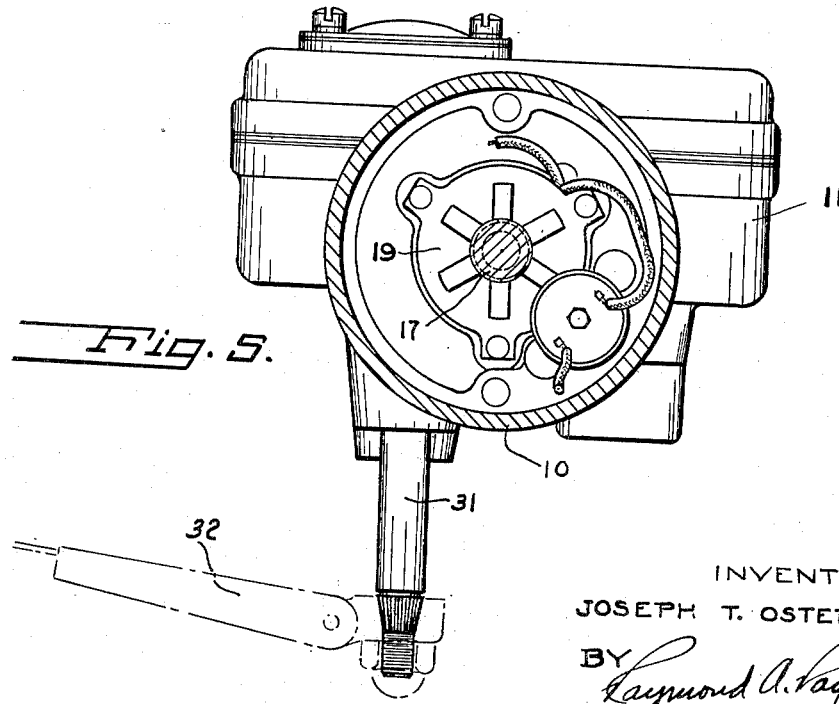
Fig. 3 is a sectional view taken on line 3—3 of Fig. 2, looking in the direction of the arrows.
Figure 3:
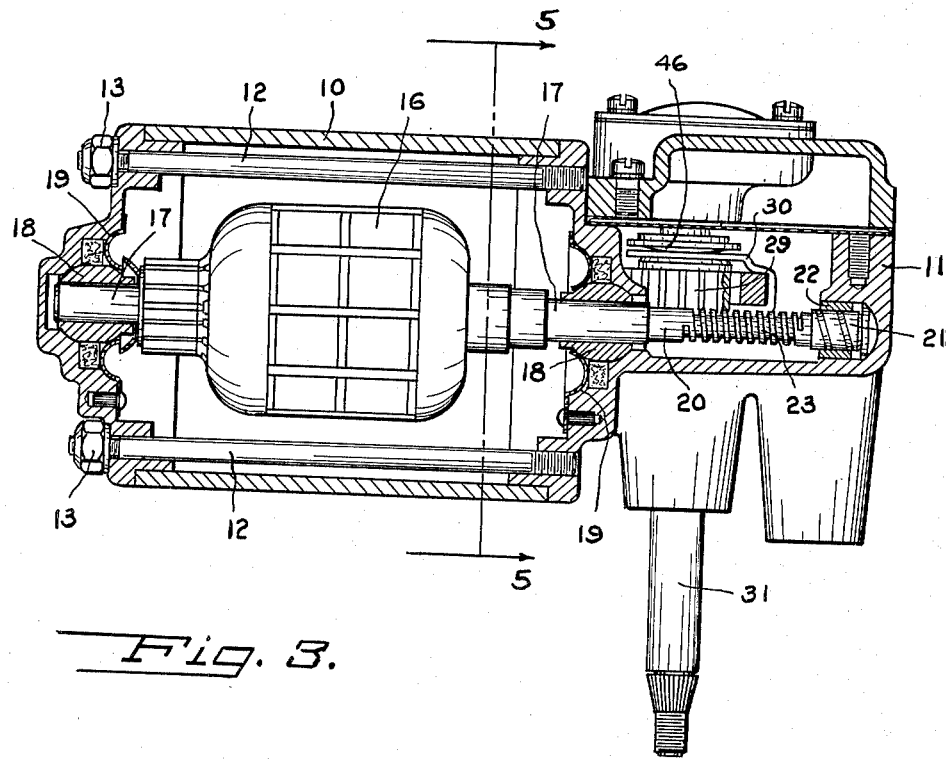

Referring more particularly to the drawings wherein similar reference characters designate corresponding parts throughout, the apparatus shown embodying the invention comprises a motor housing 10 and a gear housing 11 adapted to be retained in assembled relation by studs 12 and nuts 13, as shown in Fig. 3.

Within motor housing 10 is secured the field coil assemblies 14 by screws 15, and also in said motor housing 10 is provided armature assembly 16 on shaft 17, the ends of which are journalled in self-centering bearings 18 adjacent the opposite ends of motor housing 10, and said bearings 18 are retained in position by spiders 19 secured to the end walls of said housing 10.

The end portion 20 of shaft 17 on the side of armature assembly 16 adjacent gear housing 11 extends into said housing and the end 21 of said end portion 20 is journalled in a bearing 22 in said gear housing.

Said end portion 20 has the worm gear 23 formed thereon and adapted to mesh with gear 24 which is mounted on shaft 25 which is journalled in bearing 26.

On gear 24 is pivotally mounted crank 27 adapted to be oscillated upon rotation of gear 24 and said crank 27 has the rack portion 28 adapted to be retained in meshed relation with pinion 29 by rack holder 30. Pinion 29 is positioned on wiper shaft 31 and is adapted to drive said shaft and thereby oscillate wiper arm 32 and blade 33 as shaft 31 is oscillated upon the rotation of gear 24 and consequent movement of rack 27.

Pin 34 in shaft 31 is adapted to fit into a slot (not shown) in the face of pinion gear 29 and said gear is retained in operative relation to said pin 34 by means of coil spring 35, which arrangement forms a resilient clutch connection between gear 29 and shaft 31. Axial cam 36 for the parking mechanism is a double sided cam allowing parking adjacent either end of the stroke as desired and said cam is frictionally driven by shaft 31 and through follower 37 is adapted to separate contacts 38 and 39 by raising spring arm 40 which carries contact 38 to thereby stop operation of the motor and shaft 31 adjacent the end of the wiping stroke.

Stop pin 41 is secured to the wall of gear housing 11 and is adapted to be engaged by the opposite ears or projections 42 and 43 on yoke member 44 which is carried by U-shaped bearing member 45 which is journalled on shaft 31.

Rack holder 30 is also carried by said bearing member 45 and said rack holder 30 and yoke member 44 are spring loaded relative to each other by spring 46 which is positioned therebetween whereby said rack holder and yoke member are angularly adjustable relative to each other with the adjustment being automatically achieved by the wiper mechanism upon its first cycle of operation whereby said yoke and rack holder are angularly adjusted.

The rack holder 30 and yoke 44 are spring loaded to a degree less than the operating torque of the wiper but greater than the frictional drag on the rack holder or guide due to the separating force between the rack and pinion, that is, the rack holder or guide and the yoke member are locked in adjusted position by a force exceeding any force that may be caused by the frictional drag of the guide bearing.

The rack guide 30 can pivot only through a predetermined angle which is limited by the engagement of stop pin 41 and the projections 42 and 43 on yoke member 44 and rack guide 30 and yoke member 44 are frictionally retained in engagement and are automatically adjusted relative to each other for the particular apparatus by the reciprocation of rack 23 in rack guide 30. This arrangement provides the exact setting for the particular set of parts and compensates for any variations in the parts and the assembly thereof.

In Figs. 6 and 7 are shown the terminal 52 for the armature lead, the terminal 53 for the field coil lead and the terminal 54 for the parking mechanism lead.

Figure 4:
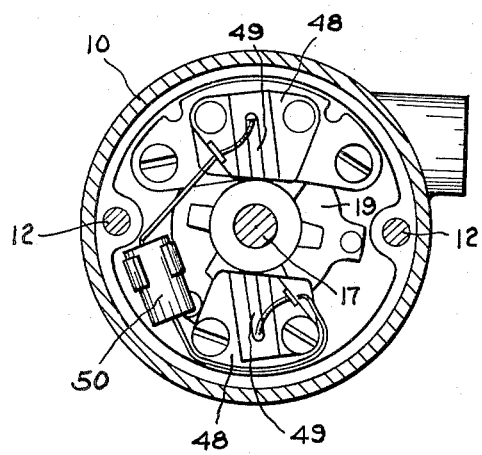
Fig. 4 is a sectional view taken on line 4—4 of Fig. 1, looking in the direction of the arrows.

In Fig. 4 is shown the brush holders 48 for brushes 49, and also the condenser 50.

While the mechanism has been shown adapted to directly drive the shaft for driving wiper arm and blade, it could be arranged to operate said shaft through a linkage arrangement connecting the driving gear and the wiper shaft.

For radio shielding the apparatus, the electrical leads should be enclosed in a shielded cable attached to electrical connector 51.

From the foregoing it will be seen that I have provided simple and efficient means for obtaining all of the objects and advantages of the invention.

Having described my invention, I claim:

1. In a device of the character described, a motor, a gear adapted to be driven by said motor, a rack pivotally connected to said gear, a drive shaft, a gear on said drive shaft and driven by said rack, a rack holder on said drive shaft adapted to retain said rack and gear on said drive shaft in engagement, a stop member, and a yoke member on said drive shaft adapted to engage said stop member and thereby limit the angular movement of said rack holder, said rack holder and said yoke member on said drive shaft being pivotally mounted and adjustable relative to each other and locking means for locking said rack holder and said yoke member in adjusted position relative to each other.

2. In a device of the character described a motor, a gear adapted to be driven by said motor, a rack pivotally connected to said gear, a drive shaft, a gear on said drive shaft and driven by said rack, a rack holder pivotally mounted on said drive shaft adapted to retain said rack and gear on said drive shaft in engagement, a stop member, and a yoke member pivotally mounted on said drive shaft adapted to engage said stop member and thereby limit the angular movement of said rack holder, said rack holder and said yoke member on said drive shaft being adjustable relative to each other, and a spring between said rack holder and said yoke member for allowing relative adjustment therebetween and retaining thereof in said adjusted relation.

3. In a device of the character described, a motor, a gear adapted to be driven by said motor, a rack pivotally connected to said gear, a drive shaft, a gear on said drive shaft and driven by said rack, a rack holder on said drive shaft adapted to retain said rack and gear on said drive shaft in engagement, a stop member, and a yoke member pivotally mounted on said drive shaft adapted to engage said stop member and thereby limit the angular movement of said rack holder, said rack holder and said yoke member on said drive shaft being adjustable relative to each other, said rack holder and said yoke member being spring loaded relative to each other.

4. In a device of the character described, a motor, a gear adapted to be driven by said motor, a rack pivotally connected to said gear, a drive shaft, a gear on said drive shaft and driven by said rack, a rack holder on said drive shaft and adapted to retain said rack and said gear on said drive shaft in engagement, a stop member, and a yoke member pivotally mounted on said drive shaft adapted to engage said stop member and thereby limit the angular movement of said rack holder, said rack holder and said yoke member on said drive shaft being adjustable relative to each other, said rack holder and said yoke member being spring loaded relative to each other to a degree less than the operating torque of said shaft but greater than the frictional drag on the rack holder due to the separating force between the rack and gear.

5. In a device of the character described, a motor, a gear adapted to be driven by said motor, a rack pivotally connected to said gear, a drive shaft, a gear on said drive shaft and driven by said rack, a rack holder pivotally mounted on said drive shaft and adapted to retain said rack and said gear on said drive shaft in engagement, a stop member, and a yoke member pivotally mounted on said drive shaft adapted to engage said stop member and thereby limit the angular movement of said rack holder, said rack holder and said yoke member on said drive shaft being adjustable relative to each other, and locking means for locking said rack holder and said yoke member in adjusted position relative to each other by a force exceeding any force due to frictional drag of the guide bearing.

JOSEPH T. OSTERMAN.

References Cited in the file of this patent

UNITED STATES PATENTS

| Number | Name | Date |
| --- | --- | --- |
| 1,853,482 | Wilson | Apr. 12, 1932 |
| 2,100,188 | Hansmann | Nov. 23, 1937 |
| 2,559,208 | Zaiger | July 3, 1951 |